(12) United States Patent
Garcia et al.

(10) Patent No.: US 11,856,454 B2
(45) Date of Patent: Dec. 26, 2023

(54) INTER-RADIO ACCESS TECHNOLOGY LOAD BALANCING UNDER MULTI-CARRIER DYNAMIC SPECTRUM SHARING

(71) Applicant: Nokia Solutions and Networks Oy, Espoo (FI)

(72) Inventors: Ian Garcia, Naperville, IL (US); Hua Xu, Naperville, IL (US); Jamil Shihab, Naperville, IL (US); Rajeev Agrawal, Naperville, IL (US); Ruth Gayde, Naperville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 129 days.

(21) Appl. No.: 17/594,918

(22) PCT Filed: May 8, 2019

(86) PCT No.: PCT/US2019/031364
§ 371 (c)(1),
(2) Date: Nov. 3, 2021

(87) PCT Pub. No.: WO2020/226644
PCT Pub. Date: Nov. 12, 2020

(65) Prior Publication Data
US 2022/0150756 A1    May 12, 2022

(51) Int. Cl.
*H04L 12/28* (2006.01)
*H04W 28/082* (2023.01)
(Continued)

(52) U.S. Cl.
CPC ........ *H04W 28/082* (2023.05); *H04B 7/2656* (2013.01); *H04W 28/086* (2023.05); *H04W 28/0958* (2020.05)

(58) Field of Classification Search
CPC ......... H04W 74/0816; H04W 74/0841; H04W 56/00; H04L 12/28
(Continued)

(56) References Cited

U.S. PATENT DOCUMENTS

| 2011/0149898 A1 | 6/2011 | Kim et al. .............. 370/329 |
| 2015/0237645 A1 | 8/2015 | Andrianov et al. |

(Continued)

FOREIGN PATENT DOCUMENTS

| EP | 2 837 110 | 10/2013 | |
| WO | WO-2021002866 A1 * | 1/2021 | ........... H04L 5/0062 |

*Primary Examiner* — Dang T Ton
(74) *Attorney, Agent, or Firm* — Harrington & Smith

(57) ABSTRACT

Inter-radio access technology (inter-RAT) load balancing under multi-carrier dynamic spectrum sharing (SS) context is provided. One method may include splitting shared radio-frequency resources into orthogonal resource pool shares. The method may include receiving a load metric for each of a plurality of radio access technologies. The method may include assigning, based on the load metric, one of the resource pool shares to each of the plurality of radio access technologies. In addition, the method may include dynamically adjusting a proportion of the assigned resource pool shares based on the load metric of each of the plurality of radio access technologies at corresponding carriers. The method may include assigning a primary carrier to a user equipment based on the load metric, the resource pool share, a coverage of the carriers' physical channels, and a type of multi-carrier operation for each of the plurality of radio access technologies.

20 Claims, 8 Drawing Sheets

(51) Int. Cl.
*H04W 28/08* (2023.01)
*H04B 7/26* (2006.01)
*H04W 28/086* (2023.01)

(58) Field of Classification Search
USPC .................................. 370/329, 400, 405, 395
See application file for complete search history.

(56) References Cited

U.S. PATENT DOCUMENTS

2016/0234718 A1* 8/2016 Thangarasa ....... H04W 28/0875
2017/0142742 A1   5/2017 Fischer et al.

* cited by examiner

INTER-RADIO ACCESS TECHNOLOGY LOAD BALANCING UNDER MULTI-CARRIER DYNAMIC SPECTRUM SHARING

CROSS REFERENCE TO RELATED APPLICATION

This patent application is a U.S. National Stage application of International Patent Application Number PCT/US2019/031364 filed May 8, 2019, which is hereby incorporated by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for inter-radio access technology load balancing under multi-carrier dynamic spectrum sharing context.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local breakout and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), and critical communications (autonomous vehicles, traffic safety, real-time analytics, time-critical control, healthcare applications).

SUMMARY

One embodiment may be directed to a method. The method may include splitting shared radio-frequency resources into orthogonal resource pool shares. The method may also include receiving a load metric for each of a plurality of radio access technologies. The method may further include assigning, based on the load metric, one of the resource pool shares to each of the plurality of radio access technologies. In addition, the method may include dynamically adjusting a proportion of the assigned resource pool shares based on the load metric of each of the plurality of radio access technologies at corresponding carriers. The method may also include assigning a primary carrier to a user equipment based on the load metric, the resource pool share, a coverage of the carriers' physical channels, and a type of multi-carrier operation for each of the plurality of radio access technologies.

Another example embodiment may be directed to an apparatus. The apparatus may include means for splitting shared radio-frequency resources into orthogonal resource pool shares. The apparatus may also include means for receiving a load metric for each of a plurality of radio access technologies. In addition, the apparatus may include means for assigning, based on the load metric, one of the resource pool shares to each of the plurality of radio access technologies. The apparatus may also include means for dynamically adjusting a proportion of the assigned resource pool shares based on the load metric of each of the plurality of radio access technologies at corresponding carriers. In addition, the apparatus may include means for assigning a primary carrier to a user equipment based on the load metric, the resource pool share, a coverage of the carriers' physical channels, and a type of multi-carrier operation for each of the plurality of radio access technologies.

Another example embodiment may be directed to an apparatus which may include at least one processor and at least one memory including computer program code. The at least one memory and the computer program code may be configured to, with the at least one processor, cause the apparatus at least to split shared radio-frequency resources into orthogonal resource pool shares. The apparatus may also be caused to receive a load metric for each of a plurality of radio access technologies. In addition, the apparatus may be caused to assign, based on the load metric, one of the resource pool shares to each of the plurality of radio access technologies. The apparatus may further be caused to dynamically adjust a proportion of the assigned resource pool shares based on the load metric of each of the plurality of radio access technologies at corresponding carriers. In addition, the apparatus may be caused to assign a primary carrier to a user equipment based on the load metric, the resource pool share, a coverage of the carriers' physical channels, and a type of multi-carrier operation for each of the plurality of radio access technologies.

In accordance with some example embodiments, a non-transitory computer readable medium can be encoded with instructions that may, when executed in hardware, perform a method. The method may split shared radio-frequency resources into orthogonal resource pool shares. The method may also receive a load metric for each of a plurality of radio access technologies. The method may further assign, based on the load metric, one of the resource pool shares to each of the plurality of radio access technologies. In addition, the method may dynamically adjust a proportion of the assigned resource pool shares based on the load metric of each of the plurality of radio access technologies at corresponding carriers. The method may also assign a primary carrier to a user equipment based on the load metric, the resource pool share, a coverage of the carriers' physical channels, and a type of multi-carrier operation for each of the plurality of radio access technologies.

In accordance with some example embodiments, a computer program product may perform a method. The method may split shared radio-frequency resources into orthogonal resource pool shares. The method may also receive a load metric for each of a plurality of radio access technologies. The method may further assign, based on the load metric, one of the resource pool shares to each of the plurality of radio access technologies. In addition, the method may dynamically adjust a proportion of the assigned resource pool shares based on the load metric of each of the plurality of radio access technologies at corresponding carriers. The method may also assign a primary carrier to a user equipment based on the load metric, the resource pool share, a coverage of the carriers' physical channels, and a type of multi-carrier operation for each of the plurality of radio access technologies.

In accordance with some example embodiments, an apparatus may include circuitry configured to split shared radio-frequency resources into orthogonal resource pool shares. The circuitry may also be configured to receive a load metric for each of a plurality of radio access technologies. The circuitry may further be configured to assign, based on the load metric, one of the resource pool shares to each of the plurality of radio access technologies. In addition, the circuitry may be configured to dynamically adjust a proportion of the assigned resource pool shares based on the load metric of each of the plurality of radio access technologies at corresponding carriers. The circuitry may also be configured to assign a primary carrier to a user equipment based on the load metric, the resource pool share, a coverage of the carriers' physical channels, and a type of multi-carrier operation for each of the plurality of radio access technologies.

In accordance with some example embodiments, a method may include determining a load metric for a plurality radio access technologies. The method may also include sending the load metric to a load balancer for processing.

The method may further include receiving, based on the processed load metric, instructions to proportion a resource pool share for each of the plurality of radio access technologies, assign a plurality of user terminals for each resource pool share proportioned to each of the plurality of radio access technologies at corresponding carriers, and for a carrier with a time-division duplex frame configuration, apply a time division duplex uplink/downlink split proportion at a radio access technology to split portions of the proportioned resource pool share for uplink or downlink transmission.

In accordance with some example embodiments, an apparatus may include means for determining a load metric for a plurality radio access technologies. The apparatus may also include means for sending the load metric to a load balancer for processing. The apparatus may further include means for receiving, based on the processed load metric, instructions to portion a resource pool share for each of the plurality of radio access technologies, assign a plurality of user terminals for each resource pool share proportioned to each of the plurality of radio access technologies at corresponding carriers, and for a carrier with a time-division duplex frame configuration, apply a time division duplex uplink/downlink split proportion at a radio access technology to split portions of the proportioned resource pool share for uplink or downlink transmission.

In accordance with some example embodiments, an apparatus may include at least one processor and at least one memory including computer program code. The at least one memory and the computer program code may be configured to, with the at least one processor, cause the apparatus at least to determine a load metric for each of a plurality radio access technologies. The apparatus may also be caused to send the load metric to a load balancer for processing. The apparatus may further be caused to receive, based on the processed load metric, instructions to proportion a resource pool share for each of the plurality of radio access technologies, assign a plurality of user terminals for each resource pool share proportioned to each of the plurality of radio access technologies at corresponding carriers, and for a carrier with a time-division duplex frame configuration, apply a time division duplex uplink/downlink split proportion at a radio access technology to split portions of the proportioned resource pool share for uplink or downlink transmission.

In accordance with some example embodiments, a non-transitory computer readable medium can be encoded with instructions that may, when executed in hardware, perform a method. The method may determine a load metric for each of a plurality radio access technologies. The method may also send the load metric to a load balancer for processing. The method may further receive, based on the processed load metric, instructions to, proportion a resource pool share for each of the plurality of radio access technologies, assign a plurality of user terminals for each resource pool share proportioned to each of the plurality of radio access technologies at corresponding carriers, and for a carrier with a time-division duplex frame configuration, apply a time division duplex uplink/downlink split proportion at a radio access technology to split portions of the proportioned resource pool share for uplink or downlink transmission.

In accordance with some example embodiments, a computer program product may perform a method. The method may determine a load metric for each of a plurality radio access technologies. The method may also send the load metric to a load balancer for processing. The method may further receive, based on the processed load metric, instructions to, proportion a resource pool share for each of the plurality of radio access technologies, assign a plurality of user terminals for each resource pool share proportioned to each of the plurality of radio access technologies at corresponding carriers, and for a carrier with a time-division duplex frame configuration, apply a time division duplex uplink/downlink split proportion at a radio access technology to split portions of the proportioned resource pool share for uplink or downlink transmission.

In accordance with some embodiments, an apparatus may include circuitry configured to determine a load metric for each of a plurality radio access technologies. The circuitry may also be configured to send the load metric to a load balancer for processing. The circuitry may further be configured to receive, based on the processed load metric, instructions to proportion a resource pool share for each of the plurality of radio access technologies, assign a plurality of user terminals for each resource pool share proportioned to each of the plurality of radio access technologies at corresponding carriers, and for a carrier with a time-division duplex frame configuration, apply a time division duplex uplink/downlink split proportion at a radio access technology to split portions of the proportioned resource pool share for uplink or downlink transmission.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for inter-radio access technology (inter-RAT) load balancing under multi-carrier dynamic spectrum sharing (SS) context.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

5G-NR has been specified within the $3^{rd}$ Generation Partnership Project (3GPP) to be able to coexist with 4G-LTE within the same spectrum. The ability to coexist in the same spectrum (i.e., spectrum sharing) may be desirable to radio access network (RAN) operators in order to save valuable spectrum resources while supporting multiple radio access technologies (RATs) under the same cellular footprint. In addition, the coexistence may occur over multiple carriers in multiple bands.

Figure 1:
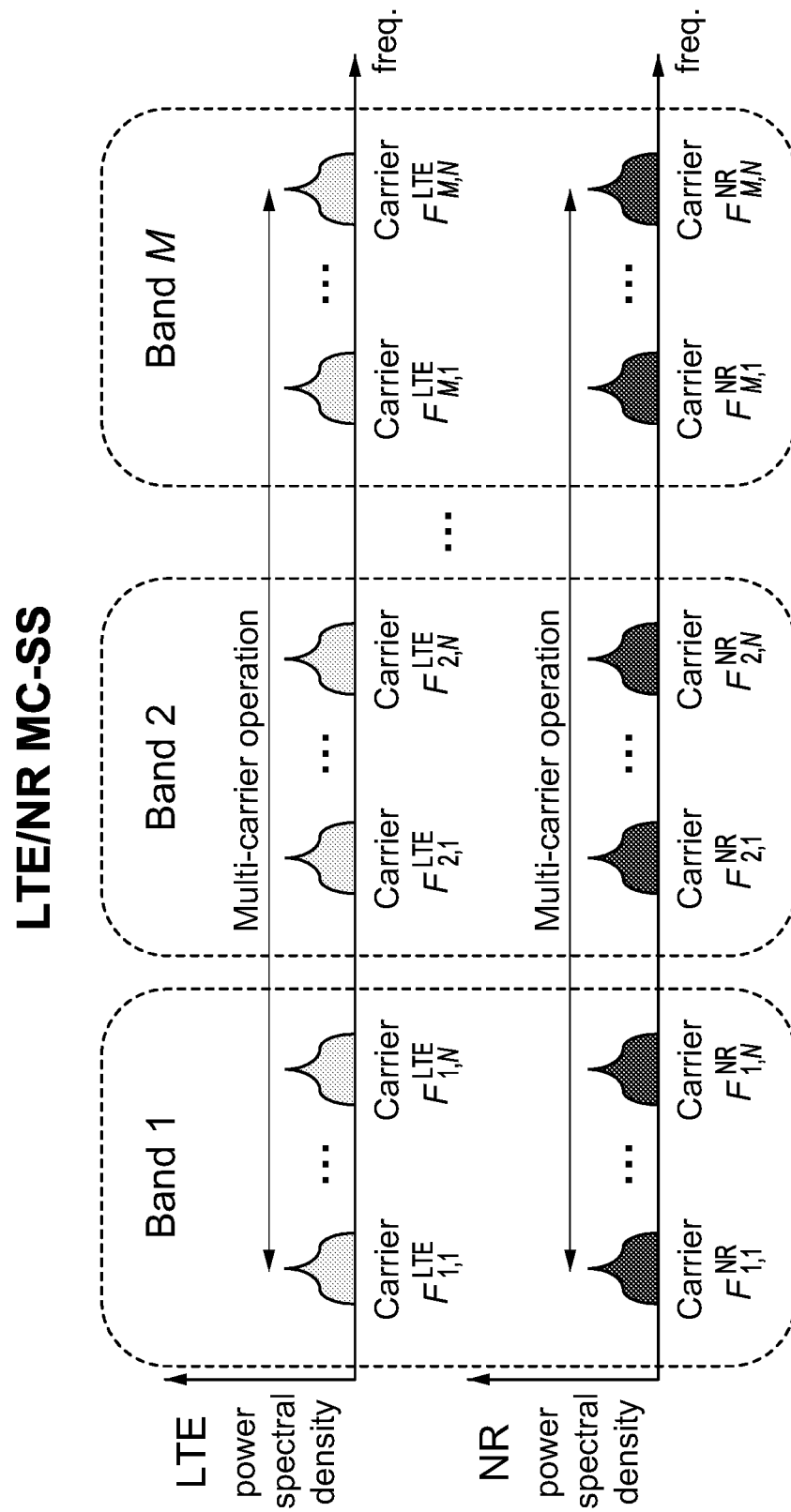
FIG. 1 illustrates a case of Long-Term Evolution and New Radio coexistence in multi-carrier spectrum sharing.

For instance, FIG. 1 illustrates a case of LTE and NR coexistence in multi-carrier spectrum sharing. As the offered data load of both RATs vary over time, the shared radio resources must be used efficiently by the wireless system operator of both RATs. This may be accomplished through either an inter-RAT load balancer (LB) or through an inter-RAT-common scheduler (CS), wherein both LB and CS may use the same throughput-maximizing or proportionally-fair-metric-maximizing framework, but at different time scales. In addition, an inter-RAT CS may offer performance benefits over LB since it may exploit subframe or slot-level fluctuations in load, but at a complexity penalty because of the synchronized multi-RAT operation needed for CS. CS not only increases complexity, but also requires low-latency information exchange and, thus, is only applicable to a "single-RAN" solution.

One advantage of 5G-NR over 4G-LTE is that only NR can support extremely wide single-carrier-bandwidth (e.g., 100 MHz) carriers, allowing for much larger throughputs. Typically, the high bandwidth carriers are at high frequency channels/band (HFB) (e.g., frequency region 2 (FR2): above 6 GHz, or frequency region 1 (FR1): between 3-6 GHz), in contrast with the low-frequency-band (LFB) (e.g., FR1: below 6 GHz, or low FR1: below 3 GHz) that generally has low bandwidth. However, at the HFB, the cell coverage is smaller due to the high penetration loss at such high frequency.

Both (wide bandwidth and small cell coverage) will cause the HFB frequency resource to be severely under-utilized in comparison with LFB. Generally, there is a large (up to 13 dB) downlink (DL) and uplink (UL) coverage gap due to the low UL transmission (Tx) power (relative to DL). In many cases, multi-carrier operation (coupling) is done between LFB and HFB carriers to mitigate such imbalance between HFB and LFB, and support improved coverage, mobility, and reliability for HFB.

Certain example embodiments may consider four multi-carrier operations. All four have been standardized for 5G-NR, while Independent Carrier Operation, Carrier Aggregation, and Multi-Connectivity have been standardized for LTE. All typically operate separately from others, but it is possible, in certain embodiments, to combine multiple operations into the same network. An effective inter-RAT multi-carrier dynamic spectrum sharing (MC-DCC) scheme must consider the dynamic traffic demands and link coverages of these schemes.

A first type of multi-carrier operation may include independent carriers (IC). Under IC, there is no direct dependency and direct interaction among carriers except for radio resource control (RRC) mobility operations such as handovers, reselection, and redirection. A UE is RRC connected to a single carrier and cannot transmit data to or receive data from another carrier simultaneously. Thus, if a UE is connected to an HFB carrier, the UE's coverage is limited by the limiting physical (PHY) channel of that carrier which is typically the physical uplink shared channel (PUSCH). In addition, the UE's throughput may be determined solely by its serving carrier.

A second type of multi-carrier operation may include carrier aggregation (CA). CA boosts peak and mean user throughput via sending user data simultaneously over multiple carriers. In addition, CA primarily increases data rates by increasing bandwidth and by dynamically distributing the traffic over multiple carriers, thereby achieving multiplexing gains across carriers.

Another way that CA can improve throughput is in the context wherein LFB is aggregated with an HFB, and where the communication link at a carrier is limited by the UL and the control channel link budget. In this scenario, the UL data, UL control and DL control for far-from-cell-center UEs are served by the LFB carrier via tight coupling with cross-carrier scheduling (TC-CCS). TC-CCS allows for the high-band DL data channel link to extend until its own link budget, since the coverage limitation of the other channels for the HFB has been removed by transmitting the other channels via the LFB carrier. As a result, CA with TC-CCS increases the throughputs of cell-edge UEs and the network.

A third type of multi-carrier operation may include multi-connectivity (MConn). Similar to CA, MConn uses multiple carriers to send data and control simultaneously. The difference between MConn and CA is that the data split occurs at the packet data convergence protocol (PDCP) layer for MConn compared to the medium access control (MAC) layer for CA. As a result, MConn increases the bandwidth and can leverage the low band carriers to send UL data, thereby allowing the high band DL to extend its coverage beyond the link budget of the UL data. However, MConn does not provide as much the multi-carrier multiplexing gains and DL coverage extension of the high band carrier as via TC-CCS across the MC carriers.

Further, a simple version of MC may include dual connectivity (DC), which uses two carriers. DC is supported by LTE, by NR across its carriers (called NR-DC) or between NR and LTE (called EN-DC). In EN-DC, the paired LTE carrier cannot share its spectrum with another LTE carrier. On the other hand it is possible for the EN-DC LTE carrier to share its spectrum with another NR carrier while also being paired with an NR carrier.

A fourth type of multi-carrier operation may include supplementary uplink (SUL). In SUL, an additional low-band UL carrier (i.e., the supplementary UL carrier) may be paired with one or more existing regular UL carriers at a higher band. The SUL carrier provides an additional UL data and control transmission path which can be carried further by the lower frequency. UEs have the option to transmit their UL either via the SUL or the regular UL, but not both. As a result, coverage is provided to cell-edge UEs but without the throughput gain associated to increased total bandwidth.

Figure 2:
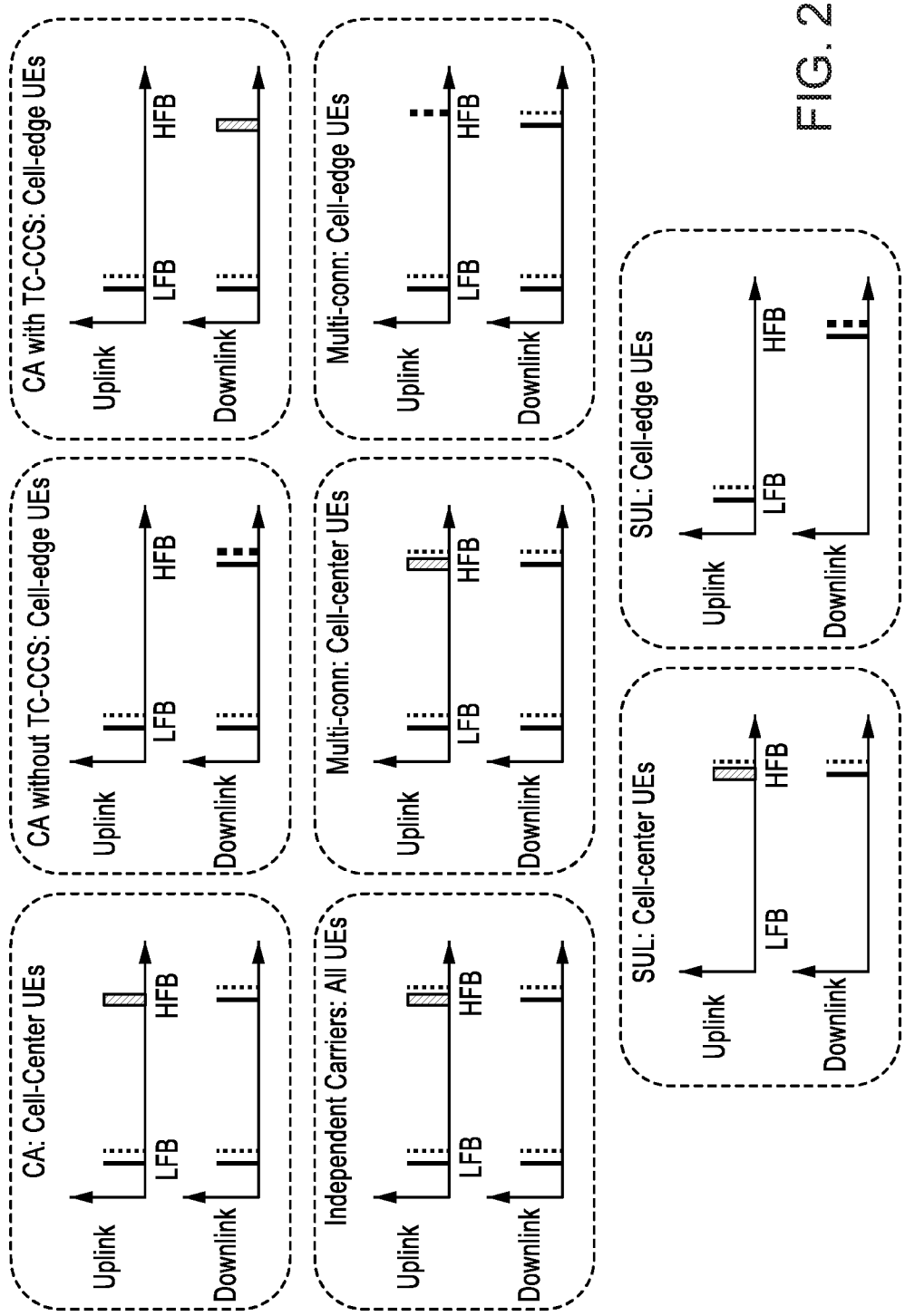
FIG. 2 illustrates physical channels used in a dual-band dual-carrier scenario.
Figure 3:
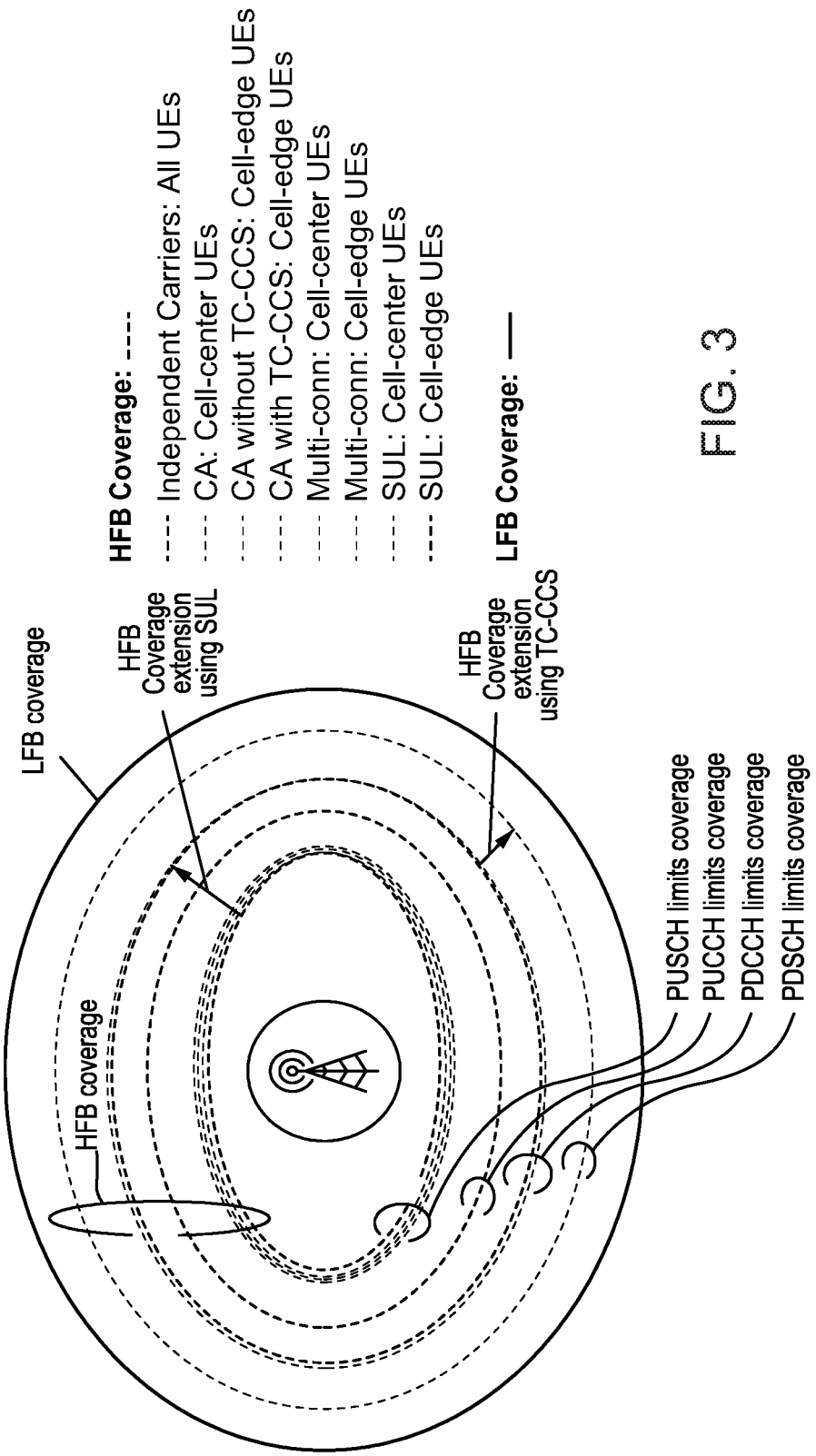
FIG. 3 illustrates cell coverage of the different scenarios in FIG. 2.

FIG. 2 illustrates PHY channels used in a dual-band dual-carrier scenario, and FIG. 3 illustrates the corresponding cell coverage scenarios of FIG. 2. In particular, FIG. 3 highlights the HFB coverage since in MC, it is desirable to extend the HFB coverage as much as possible. This is done to bring the higher throughput benefit of having two available carriers to a larger proportion of UEs.

In multi-carrier (MC) operation, each UE may be assigned a primary carrier (i.e., the carrier of either its Pcell for CA, Master cell for DC, UL carrier for SUL, or serving cell for IC), while one or more of the carriers are assigned as secondary carriers. A UE's primary carrier acts as the default carrier for sending data and is typically its sole carrier for sending higher layer control information and radio link monitoring. Since a UE's data and control information primarily course through the primary carrier, the primary carriers must be equitably assigned across the UEs to prevent overburdening some of the carriers and achieve a balanced load. As such, an effective inter-RAT MC-DSS scheme must consider the link coverages of each of these MC schemes and their dynamic load to achieve efficient utilization of the spectrum for all RATs.

If a carrier supports a time division duplex (TDD) frame configuration, the UL and DL may potentially compete for the same time resources. To carry both DL and UL fairly, an UL-DL LB may determine the proportion of slots/subframes that are split for either DL or UL transmissions. 5G-NR and LTE support TDD, and would benefit in a LB that balances the TDD UL-DL split while considering coexistence and multi-carrier operation.

It may be beneficial to perform MC operation for NR wherein at least one of the aggregated carriers is at the HFB (for improved throughput), and at least one is at the LFB (for improved coverage). However, in certain cases, the LFB may already be saturated with LTE carriers when NR is deployed. Through multi-carrier spectrum sharing of certain example embodiments, LFB resources may be utilized together with the HFB carrier for new 5G users while maintaining the same LFB resources to support pre-existing LTE users. Certain example embodiments may also provide solutions to equitably share both the spectrum and time resources to UEs of both RATs and over multiple carriers.

Further, certain example embodiments may define an LB algorithm that handles both spectrum sharing (between LTE and NR) and LFB and HFG coupling (within NR). This is in addition to the existing LB among carriers within LTE and within NR, and UL/DL split for TDD systems. As such, LB may be a feasible for dynamic spectrum sharing (DSS) at the onset of coexistent NR-LTE deployments.

Currently, there are no known load balancing schemes that are tailored to MC-DSS. For example, in conventional MC load balancing, the Pcell assignments do not consider the shared spectrum resources at each carrier. Thus, the conventional MC LB scheme, when applied to the MC-DSS, may lead to an insufficient number of resources for the other RAT. On the other hand, according to certain example embodiments, it is possible to take into consideration the load of the other RAT when assigning users to the primary carriers in order to allow enough resources for the other RAT. Certain example embodiments may also consider the load of the other RAT when calculating TDD UL/DL split and shared resource pool split. The result may include a throughput-optimized allocation of common resources for both RATs used by an operator.

Figure 4:
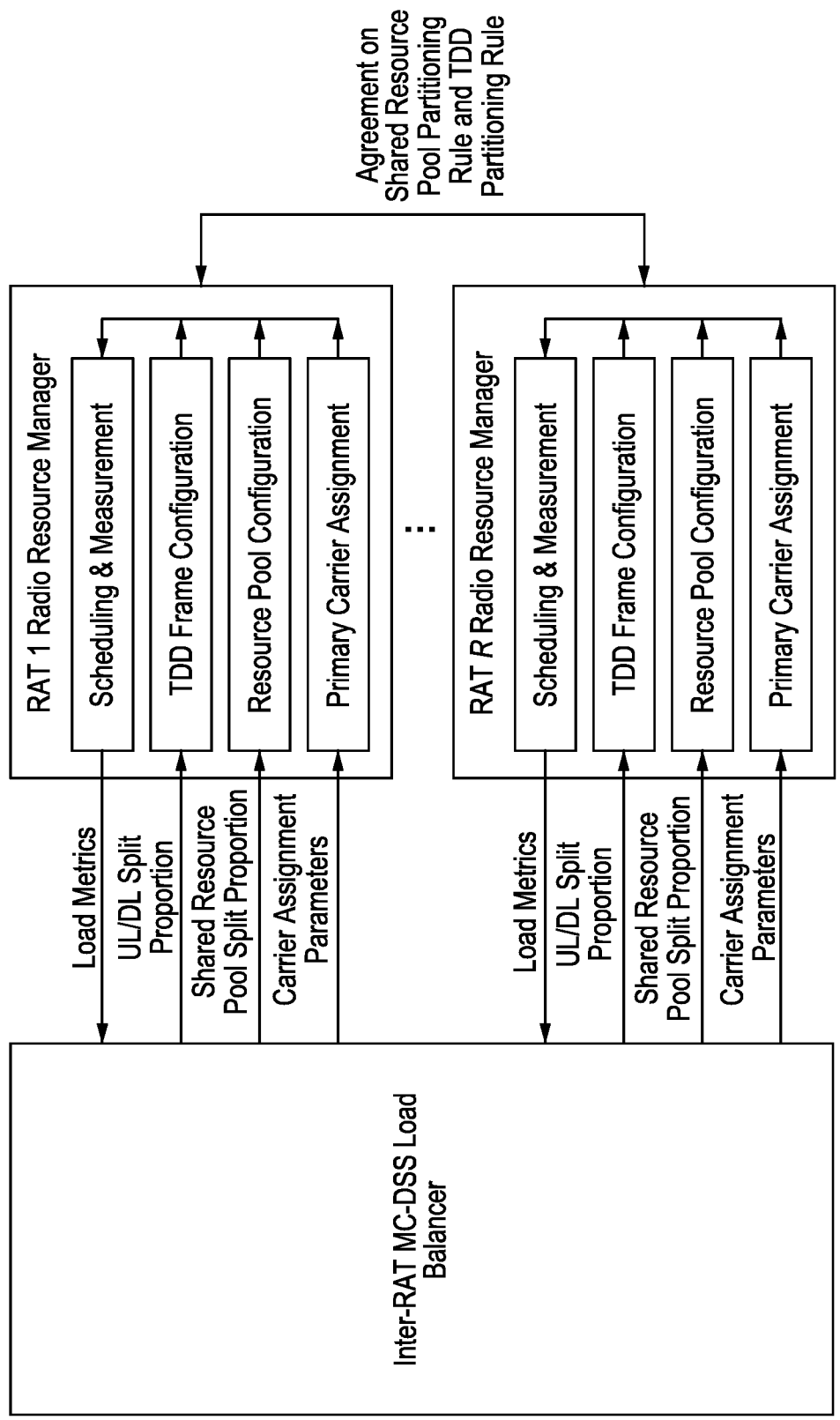
FIG. 4 illustrates an inter-radio access technology (inter-RAT) load balancer input/output relationship to RAT radio resource managers, according to an example embodiment.

Various spectrum sharing mechanisms and standards in unlicensed bands may be in use by various technologies. Some of these technologies may use multiple carriers. However, these RATs are operated independently of each other, and there is no load balancing across RATs by an operator in unlicensed band operation. Thus, certain example embodiments provide solutions for inter-RAT load balancing of MC-DSS (MC-DSS LB), which maximizes user throughputs and improves reliability by iteratively and equitably adjusting the 1) receive signal strength (RSS) or power headroom thresholds and target assignment proportions for primary carrier assignment, 2) the partitioning of shared resource pools, and 3) the TDD frame configuration. All three may dynamically update based on each scheduler's load metrics (LMs) to balance both links. FIG. 4 illustrates an inter-RAT load balancer input/output relationship to RAT radio resource managers (RRMs), according to an example embodiment.

Certain example embodiments may provide a united inter-RAT load balancing scheme that may be performed either through a closed-form iterative procedure, or via deep learning. As will be described in more detail herein, certain example embodiments may perform inter-RAT load balancing in the context of spectrum sharing with multi-carrier operation, optimized for the type of multi-carrier operation used. Other example embodiments may provide load balancing across two or more RATs, two or more carriers, and one or more bands. According to an example embodiment, the LB may perform primary carrier assignment, shared resource pool splitting, and TDD UL/DL splitting to optimize user throughput across both RATs and both UL and DL.

According to certain example embodiments, carrier assignments of users may consider the link budget of different multi-carrier operation types and load of the shared resource pool. In an example embodiment, an option of using a proportionally fair metric as the load metric for load balancing may be provided. Doing so may maximize the sum of the log-throughputs across all RATs and all carriers, and incorporate quality-of-service (QoS). In addition, certain example embodiments may provide an option of using resource pool share utilization as the load metric for load balancing, which equalizes the utilization of shared resources across all RATs and all carriers. In a further example embodiment, a closed-form iterative scheme may be provided based on historic load metrics. Further, the iterative scheme may modify the primary/master carrier assignment, shared resource pool split, and TDD UL/DL split one at a time.

In an example embodiment, the inter-RAT LB scheme may split the shared radio-frequency resources into orthogonal (i.e., non-co-interfering) resource pools, where each RAT may be assigned a resource pool. The resource pool may be an aggregation of segments of time and frequency that is for exclusive use of a RAT and not any other. Further, the LB may adjust the proportion of each resource pool based on the relative offered data load of each RAT at each carrier. After the resource pool proportion is determined by the LB, scheduling of UEs may be done by each RAT network for its pool resource pool, independently. In addition, the LB may assign UEs to their appropriate primary carriers considering the intra-RAT and inter-RAT load on those carriers. Moreover, the LB may calculate the TDD UL/DL split proportion considering the utilization of the resource pools of multiple RATs at each carrier.

According to an example embodiment, the RATs may have an agreement on how to partition the shared resource pool (RP) among themselves so that when they receive their corresponding resource pool split portion from the LB, orthogonality between the RP partitions is ensured. Furthermore, the RATs may have an agreement on how to partition the TDD frame configuration so that when the UL/DL split proportion is decided by the LB, the UL and DL transmissions across RATs would be synchronized. In an example embodiment, the partitioning rules for the RP and TDD may be determined by one of the RRMs or by another entity such as the LB.

In the following, LM formulation according to certain example embodiments is described. In an example embodiment, the load metric formulation may consider the RP share of each RAT in the context of MC-DSS. In addition, the LM quantity may incorporate the QoS prioritization of data and allow for load balancing even for full buffer traffic conditions.

According to an example embodiment, the load balancing scheme may be formulated based on the load at each RAT/carrier/link combination. For example, in certain embodiments, the LM of a DL/UL link of a cell on the carrier may be formulated as either an average cell proportionally fair metric (ACPF) for the link or the cell's averaged resource pool share utilization (ARPSU). In an example embodiment, the LM for the DL cell or UL cell at the carrier may be denoted as n (n=1, ..., N) of band m (m=1, ..., M) of RAT r (r=1, ..., R) as $L_{r,m,n}^{DL}$ or $L_{r,m,n}^{UL}$ respectively.

In the first LM option of ACPF, most packet schedules of RATs may use proportionally fair (PF) queuing in assigning users in the time and frequency domain. Further, the downlink PF metric of user u for the kth time-frequency-code-space resource for carrier [r, m, n] may be given by:

$$\rho_{r,m,n}^{DL,u,k} = q_u \frac{T_{r,m,n}^{DL,u,k}}{\overline{T}_{r,m,n}^{DL,u}}, \quad (1)$$

where $T_{r,m,n}^{DL,u,k}$ is the achievable DL instantaneous throughput of the uth user at the kth resource of carrier [r, m, n], and $\overline{T}_{r,m,n}^{DL,u}$ is the averaged downlink throughput of the uth user of carrier [r, m, n] which may consider the ACK/NACK feedback of transmissions. In addition, $q_u$ ($q_u>0$) is a Quality-of-service (QoS) weighting factor which is based on the type of carried traffic and retransmission number. The instantaneous throughput may depend on the receive signal-to-noise-ratio (SINR), multiple-input multiple-output (MIMO) rank, and data buffer size of the user. Moreover, the SINR may consider the receiver noise floor, the inter-cell interference, multi-user-MIMO cross-beam interference, and non-orthogonal multiple-access (NOMA) interference.

In an example embodiment, the uplink PF metric ($\rho_{r,m,n}^{UL,u,k}$) may be similarly formulated. Further, according to another example embodiment, for ACPF, the downlink LM for the carrier [r, m, n] may be formulated as:

$$L_{r,m,n}^{DL} = L_{r,m,n}^{DL,ACPF} = g_{r,m,n}^{DL} E\left( \sum_{k=1}^{K_{r,m,n}^{DL}} \sum_{u}^{U_{r,m,n}^{DL}} v_{u,k}^{DL} \rho_{r,m,n}^{DL,u,k} \right), \quad (2)$$

where $K_{r,m,n}^{DL}$ is the total number of resources for the part of the pool assigned for the rth RAT, $U_{r,m,n}^{DL}$ is the total number of downlink users, and $v_{u,k}^{DL} \in \{0, 1\}$ is the user selection indicator for the uth-kth user-resource pair, and E( ) is a sample averaging function which can be across samples in time or across a group of cells or both. In an example embodiment, the sample averaging function may be implemented through a discrete time filter. In addition, the LB may use a filter with a different correlation time for the E( ) of each stage of the LM scheme, depending on the update period of each stage. The term $g_{r,m,n}^{DL}$ (where $g_{r,m,n}^{DL}>0$) is a carrier-specific load multiplier to optionally provide prioritization across carriers.

According to an example embodiment, for the single-user MIMO case with PF scheduling, the user selection indicator may be formulated as:

$$v_{u,k}^{DL} = \begin{cases} 1 & \text{for } \rho_{r,m,n}^{DL,u,k} = \max_u \rho_{r,m,n}^{DL,u,k} \\ 0, & \text{otherwise} \end{cases} \quad (3)$$

where selecting the PF-maximizing user for the resource is known as "cherry-picking." The uplink LM $C_{r,m,n}^{UL,ACPF}$ may be similarly formulated.

In other example embodiments, at higher data traffic loads, a data queue may start to build up at the buffer which would lead to a higher maximum PF metric. Thus, in certain example embodiments, it is possible to use the PF metric as a measure of load, especially at higher loads.

In another example embodiment, as a second LM option, ARPSU may formulate the downlink LM as follows:

$$L_{r,m,n}^{DL} = \qquad (4)$$

$$L_{r,m,n}^{DL,ARPSU} = g_{r,m,n}^{DL} E\left( \sum_{k=1}^{K_{r,m,n}^{DL}} z_k^{DL} + \rho \frac{\sum_u^{U_{r,m,n}^{DL}} d_{u,k}^{DL}}{\sum_{k=1}^{K_{r,m,n}^{DL}} \sum_u^{U_{r,m,n}^{DL}} v_{u,k}^{DL} T_{r,m,n}^{DL,u}} \right),$$

where $z_k^{DL} \in \{0, 1\}$ is the resource selection indicator for the kth resource of the pool and $d_{u,k}^{DL}$ is the amount of remaining data in the buffer. The fractional term represents the predicted amount of resources needed to drain the remaining data in the buffer, and $p \in \{0, 1\}$ is an activation/deactivation parameter for the fractional term. In an example embodiment, the uplink LM $L_{r,m,n}^{UL,ARPSU}$ may be similarly formulated.

According to certain example embodiments, by load balancing by using the resource pool share utilization as the load metric, the utilization of shared resources may be equalized across all RATs and all carriers. Load balancing using the ACPF metric may incorporate QoS, which the ARPSU does not. However, load balancing using the ARPSU may be simpler than through the ACPF.

In the following, MC-DSS LB operation according to certain example embodiments is described. In an example embodiment, MC-DSS LB operation may be characterized in terms of a three-loop architecture. For example, the LB scheme may iteratively optimize the resource split and user assignments across multiple RATs, links (i.e., UL/DL), bands, and carriers using a common load metric. The scheme may also yield maximized total log throughputs or equalized utilization of resources across all RATs, links, bands, and carriers.

Figure 5:
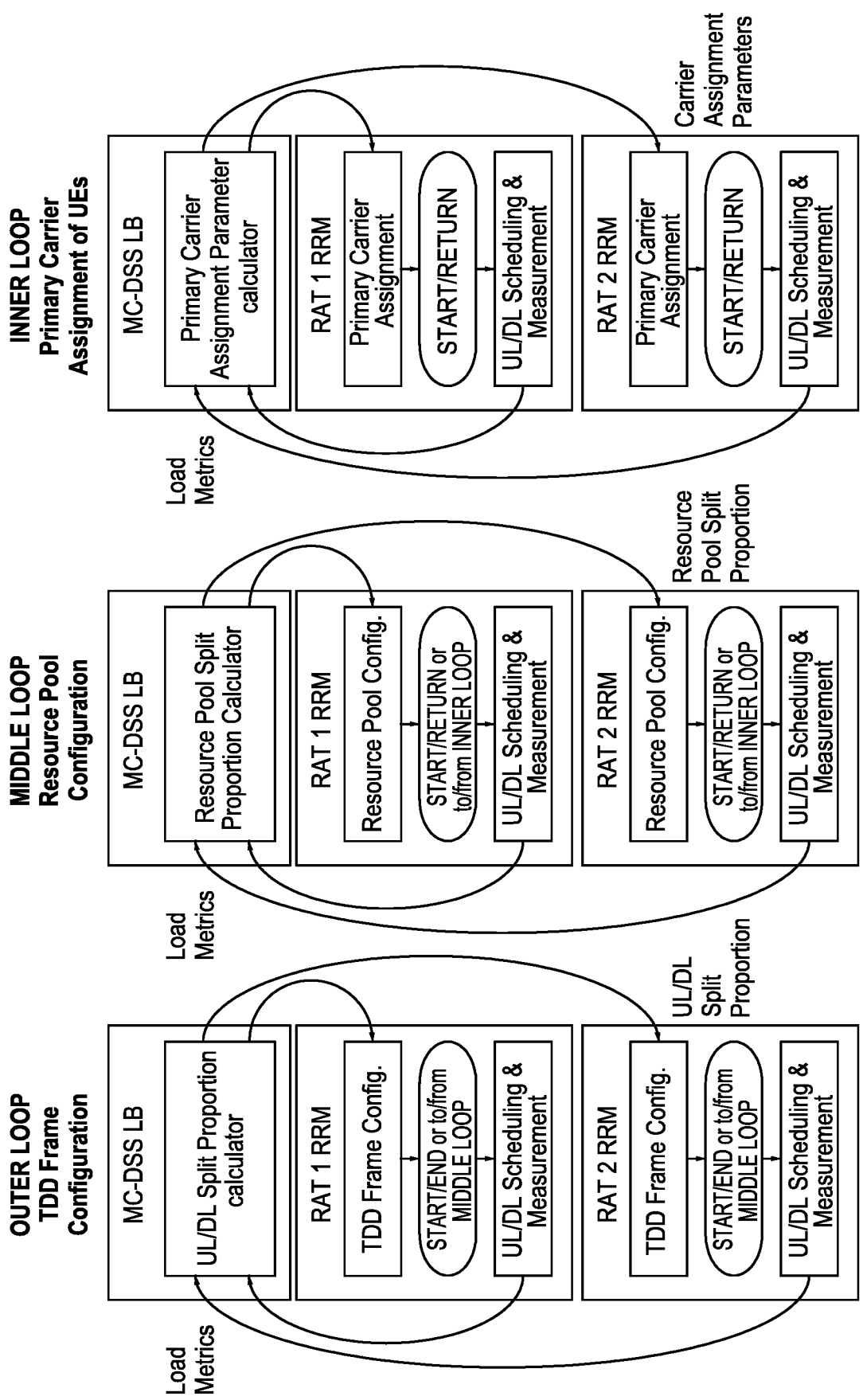
FIG. 5 illustrates an iterative multi-carrier dynamic spectrum sharing load balancing operation, according to an example embodiment.

FIG. 5 illustrates an iterative multi-carrier dynamic spectrum sharing (MC-DSS) load balancing (LB) operation, according to an example embodiment. As illustrated in FIG. 5, the iterative operation includes an outer loop of a TDD frame configuration, a middle loop of a resource pool configuration, and an inner loop of a primary carrier assignment of UEs.

In the outer loop, after some scheduling period or after being triggered, the scheduler of each cell may measure and pass load metrics to the LB. With the load metrics, LB may then calculate the UL/DL split proportions based on the combined reported load metrics of one or more cells. The LB may also pass the split proportion to the TDD Frame Configuration of each cell, which then applies the split proportion. Once each cell applies the split proportion, the middle loop may be performed, and the procedures of the outer loop may be repeated infinitely.

In the middle loop, after some scheduling period or after being triggered, the scheduler may measure and pass load metrics to the LB. With the load metrics, the LB may calculate the resource pool split proportions of each RAT for one or more cells. In addition, the LB may pass the split proportion to the Resource Pool Configuration, which then applies the split proportion. Once each cell applies the split proportion, the inner loop may be performed, and the procedures of the middle loop may be repeated for a few iterations such as, for example, one or more iterations. In an example embodiment, one iteration may include the measurement of the load metrics, calculation of the configuration parameter, and application of the configuration parameter.

In the inner loop, after some scheduling period or after being triggered, the scheduler may measure and pass load metrics to the LB. For one or more cells, the LB may calculate the target number of UE proportions of each carrier and receive signal strength (RSS) thresholds of each band. In an example embodiment, the number of UE proportions for each carrier may be based on the size of the resource pool of each carrier. In addition, the RSS thresholds may aim to equitably appropriate UEs to different bands while ensuring that the coverage of each band (based on the type of MC operation) is not exceeded.

According to an example embodiment, in the inner loop, the calculated target UE proportions and RSS thresholds may be passed on to the Primary Carrier Assignment after the LB calculates the target number of UE proportions of each carrier and RSS thresholds of each band. The Primary Carrier Assignment may then apportion the UEs based on the target proportions per carrier and the RSS thresholds per band. Following the apportions, scheduling may be performed by the cell. As with the outer and middle loops, the procedures of the inner loop may be repeated a few iterations, and the process may return to the middle loop. As previously noted, the number of iterations may be one or more iterations. In an example embodiment, one iteration may include the measurement of the load metrics, calculation of the configuration parameter, and application of the configuration parameter.

In the following, formulas for generalization to multiple RATs, multiple bands, and multiple carriers are described according to certain example embodiments is described. In an example embodiment, a TDD frame configuration may be provided. Here, UL/DL split proportion calculation may be considered. For example, the UL/DL split proportion may consider the LM of multiple RATs. Further, the UL/DL split formulation may maximize the total log throughput of the UL with the DL.

In an example embodiment, the LB may calculate the UL/DL split proportion at each TDD carrier of each band independent of other carriers. The proportion of time-domain resources utilized for DL of the nth carrier of the mth band ($\tau_{m,n}^{DL}$) may be:

$$\tau_{m,n}^{DL} = \max\left(\min\left(\frac{\sum_{r=1}^{R} L_{r,m,n}^{DL}}{\sum_{r=1}^{R} L_{r,m,n}^{DL} + \sum_{r=1}^{R} L_{r,m,n}^{UL}}, \tau_{max}^{DL}\right), \tau_{min}^{DL}\right), \quad (5)$$

where $\tau_{max}^{DL}$ and $\tau_{min}^{DL}$ ($0 \leq \tau_{min}^{DL} \leq \tau_{max}^{DL} \leq 1$) are preset maximum and minimum values respectively to ensure the presence of resources on both uplink and downlink.

Complementarily, the proportion of time-domain resources utilized for UL ($\tau_{m,n}^{UL}$) may be:

$$\tau_{m,n}^{UL} = 1 - \tau_{m,n}^{DL} \quad (6)$$

Further, the LB may pass these UL/DL split proportions to the TDD Frame Configurator to split the pool of subframes/slots/symbols for UL or DL transmission.

In another example embodiment, a resource pool configuration may be provided. Here, resource pool split proportion calculation may be performed. For example, the resource pool configuration may equitably split the shared resource pool of each carrier to maximize log throughputs across multiple RATs at each carrier, and may consider the QoS prioritization.

In the resource pool configuration, the LB may calculate the resource pool split proportion of the rth RAT of the nth carrier of the mth band for the DL as follows:

$$\gamma_{r,m,n}^{DL} = \frac{L_{r,m,n}^{DL}}{\sum_{r=1}^{R} L_{r,m,n}^{DL}}. \quad (7)$$

The LB may pass these RP split proportions to the resource pool configurator to split the shared pool of resources to each RAT. Each RAT may then be allocated the corresponding number of resources for its pool: $K_{r,m,n}^{DL} = \text{round}(K_{total,m,n}^{DL} \gamma_{r,m,n}^{DL})$ where $K_{total,m,n}^{DL}$ is the total number of resources shared between the RATs and round( ) is the rounding operation to the nearest integer.

According to another example embodiment, a primary carrier assignment (PCA) may be provided. The PCA scheme may use a load metric conditioned on the resource split across multiple RATs. In addition, the PCA may equitably assign or reassign UEs to the different bands and carriers to maximize log throughputs across multiple RATs, and may consider the QoS prioritization. Further, the band assignment may consider the link budget based on the type of multi-carrier operation used. In one example embodiment, the two process PCA operation may involve assigning a user to a band and then to a carrier within the band.

Under PCA, the following assumptions may be made according to certain example embodiments. For example, it may be assumed that utilized bands are indexed in ascending order such that the first band is at the lowest frequency, and the final band (mth) is at the highest frequency. In addition, the base station transmitters/receives of carriers of all bands may be co-located. Moreover, lower indexed bands, being at the lower frequency, may have greater RF coverage compared to higher indexed bands. Further, carriers of the same band may have the same coverage, and a UE may not be assigned to a carrier in a band if it is outside the band's coverage area. In addition, the primary carrier of a UE for DL may be different from its primary carrier for UL.

According to an example embodiment, PCA may be performed using at least two processes, 1) band assignment, and 2) intra-band carrier assignment. For example, a UE may first be assigned to a band and then to a carrier of a band. However, the calculation of the thresholds used for UE assignment may be performed simultaneously, or they may also be performed alternatively, with a scheduling and measurement step in between each process.

With band assignment of UEs, the first PCA process may include the allocation of connected users to different bands. Since the radio coverage of higher bands is limited, inter-band carrier assignment may use an RSS or power headroom (PHR) threshold for qualification, typically in units of dBm or decibels. In an example embodiment, the downlink RSS or PHR coverage threshold for band [r, m] may be denoted as $S_{r,m}^{DL,thresh}$, and $S_{r,m}^{DL,u}$ may be the RSS or PHR of the uth user on a carrier as measured on that band. The in-coverage flag for the uth user may be given as:

$$\sigma_{r,m}^{DL,u} = \begin{cases} 1 & \text{for } S_{r,m}^{DL,u} \geq S_{r,m}^{DL,thresh} \\ 0, & \text{otherwise} \end{cases}, \quad (7)$$

where $\sigma=1$ signifies that the UE is within coverage of the band $L_{r,m}^{DL}$. The uplink in-coverage flag $\sigma_{r,m}^{UL,u}$ may be similarly derived.

In an example embodiment, the LB may iteratively adjust the threshold $S_{r,m}^{DL,thresh}$ based on the average LM of the band compared to that of the average LM across all bands. The threshold adjustment ($S_{r,m}^{DL,delta}$) may be proportional to the difference in load metrics or proportional to the ratio of load metrics.

According to certain example embodiments, band assignment of UEs may include two coverage threshold adjustment options. The first option in one example embodiment may be LM difference based as follows:

$$S_{r,m}^{DL,delta} = \beta\left(\frac{1}{N}\sum_{n=1}^{N} L_{r,m,n}^{DL} - \frac{1}{(M-1)N}\sum_{j=1, j\neq m}^{M}\sum_{n=1}^{N} L_{r,j,n}^{DL}\right), \quad (8)$$

where $\beta(\beta>0)$ is a pre-set multiplier which controls the speed of threshold adjustment.

The second option in another example embodiment may be an LM ratio based as follows:

$$S_{r,m}^{DL,delta} = \beta\log\left(\frac{\frac{1}{N}\sum_{n=1}^{N} L_{r,m,n}^{DL}}{\frac{1}{(M-1)N}\sum_{j=1, j\neq m}^{M}\sum_{n=1}^{N} L_{r,j,n}^{DL}}\right). \quad (9)$$

For all bands except for the lowest band, the new coverage threshold may be determined by the prior coverage threshold, the adjustment, and the minimum coverage threshold $S_{r,m}^{DL,min}$ for the band as follows:

$$S_{r,m}^{DL,new} = \qquad (10)$$

$$\begin{cases} S_{r,m}^{DL,min} & \text{for } m = 1 \\ \min(\max(S_{r,m}^{DL,old} + S_{r,m}^{DL,delta}, S_{r,m}^{DL,min}), S_{r,m}^{DL,max}), & \text{otherwise} \end{cases}$$

where $S_{r,m}^{DL,max}$ is a pre-set maximum coverage threshold for the band, and $S_{r,m}^{DL,min}$ is the coverage threshold of the coverage-limiting PHY channel in use on that band. Further, PHY channels in use for a band may be determined by the multi-carrier operation type, and in most cases, the coverage limiting PHY channel may be provided in Table I and illustrated in FIGS. 2 and 3.

TABLE I

Minimum Coverage Threshold under multi-carrier operation (i.e. higher band: m > 1)

| Multi-carrier operation | Coverage-limiting PHY channel of the HFB | Minimum Coverage Threshold ($S_{r,m}^{DL,min}$) |
| --- | --- | --- |
| Independent Carriers | PUSCH | $S_{r,m,PUSCH}^{DL,min}$ |
| *Carrier Aggregation without TC-CCS | PDCCH | $S_{r,m,PDCCH}^{DL,min}$ |
| Carrier Aggregation with TC-CCS | PDSCH | $S_{r,m,PDSCH}^{DL,min}$ |
| Multi-Connectivity | PUCCH | $S_{r,m,PUCCH}^{DL,min}$ |
| *Supplemental Uplink | PDCCH | $S_{r,m,PDCCH}^{DL,min}$ |

As shown in Table I, both CA without TC-CCS and SUL are limited by the PUDCCH at the HFB. In addition, CA without TC-CCS has LFB downlink, while SUL does not.

According to certain example embodiments, for the case wherein the average LM for the band is greater than the average across bands, the adjustment factor $S_{r,m}^{DL,delta}$ is positive, leading to potentially fewer users assigned to the carriers of that band in the next update cycle, which may further lead to more similar LM values across bands and higher user log-throughputs.

In another example embodiment, LB may pass the new coverage threshold values ($S_{r,m}^{DL,new}$) to each RRM's PCA. The PCA may then reassign an existing connected user or assigns a newly-connected user by checking its in-coverage flag ($\sigma_{r,m}^{DL,u}$) and applying band prioritization, wherein higher bands may be given a higher priority. As such, if $\sigma_{r,i}^{DL,u} = \sigma_{r,j}^{DL,u} = 1$ and i>j, then a user may be (re)assigned to the ith band instead of the jth band. The new band assignment index for the uth user on the mth band is denoted as $b_r^{DL,u} = m$. The uplink band assignment $b_r^{UL,u}$ may take the same downlink band assignment or be calculated independently. Once a user is assigned to a band, it is assigned to one of the band's carriers according to the carrier assignment probability derived by the intra-band carrier assignment process.

According to an example embodiment, a second PCA process may include intra-band carrier assignment of UEs. Here, the second PCA process is the allocation of in-band users to carriers of the same band. This may be used when there are two or more carriers for each band. In addition, the second PCA process may be used when there are two or more carriers for each band. Its goal is to equalize the load metrics across the carriers of a band. If, however, the ACPF metric is used, then equalizing the LMs would also potentially lead to higher sum log-throughputs.

In an example embodiment, intra-band carrier assignment may compensate the present load levels by either reassigning existing users from congested carriers to less congested carriers, or by assigning a lower assignment probability on congested carriers for newly connected users. To equalize the future load, the carrier assignment probability ($u_{r,m,n}^{DL}$) of a user to a carrier is complementary to the carrier's current LM relative to other carriers' current LMs, and is formulated as:

$$u_{r,m,n}^{DL} = \begin{cases} 1 & \text{for } N = 1 \\ \dfrac{L_{r,m,max}^{DL} + L_{r,m,min}^{DL} - L_{r,m,n}^{DL}}{N(L_{r,m,max}^{DL} + L_{r,m,min}^{DL}) - \sum_{n=1}^{N} L_{r,m,n}^{DL}}, & \text{otherwise} \end{cases} \qquad (11)$$

where $$L_{r,m,max}^{DL} = \max_n L_{r,m,n}^{DL} \text{ and } L_{r,m,min}^{DL} = \min_n L_{r,m,n}^{DL}.$$

This expression ensures that in the next update cycle, highly congested carriers are deprioritized compared to less congested carriers. If the update period of carrier assignment is shorter than the correlation time of the LM based only on natural UE arrivals and departures, load balancing based on the load metric may still be achieved by using carrier-specific load multipliers, wherein ($L_{r,m,n}^{LD} = g_{r,m,n}^{DL}$) is used for eq. (11). The sum of the carrier assignment probability for each band is 1.

According to an example embodiment, the LB may pass these carrier assignment probabilities to the RRM PCA which then applies these in assigning the primary/master carrier of a new user or in reallocating existing users to other carriers. The assignment may be done via 1) a probability-weighted coin toss, 2) by always assigning a new user to the carrier(s) with the highest assignment probability, or by 3) randomly assigning a new user only to carriers with probability $u_{r,m,n}^{DL} \geq 1/N$. According to an example embodiment, the probability-weighted coin toss may include randomly generating a discrete number corresponding to the carrier IDs according to the carrier assignment probability (e.g., Eq. (11)). The user may then be assigned to the carrier corresponding to the generated number.

In an example embodiment, the new carrier assignment index for the uth user of the nth carrier of the mth band may be denoted as $c_{r,m}^{DL,u} = n$. The uplink band assignment $c_{r,m}^{UL,u}$ may take the same downlink carrier assignment or be calculated independently.

The following example embodiments relate to a special case formulation of LTE and NR with a two-carrier LFB and HFB operation. For the TDD frame configuration, UL/DL split calculation may be provided. In particular, for carriers that are TDD, the proportion of time-domain resources utilized for DL ($\tau_{LFB}^{DL}$) is:

$$\tau_{LFB}^{DL} = \qquad (12)$$

$$\max\left(\min\left(\dfrac{L_{LTE,LFB}^{DL} + L_{NR,LFB}^{DL}}{L_{LTE,LFB}^{DL} + L_{NR,LFB}^{DL} + L_{LTE,LFB}^{UL} + L_{NR,LFB}^{UL}}, \tau_{max}^{DL}\right), \tau_{min}^{DL}\right).$$

Complementarily, the proportion of time-domain resources utilized for UL ($\tau_{LFB}^{UL}$) is:

$$\tau_{LFB}^{UL} = 1 - \tau_{LFB}^{DL}. \qquad (13)$$

The calculations for the $\tau_{HFB}{}^{DL}$ and $\tau_{HFB}{}^{UL}$ may similarly be derived.

For the resource pool configuration, resource pool split proportion may be determined. For example, the LB calculates the resource pool split proportion of the LTE of the LFB for the DL as follows:

$$\gamma_{LTE,LFB}^{DL} = \frac{L_{LTE,LFB}^{DL}}{L_{LTE,LFB}^{DL} + L_{NR,LFB}^{DL}}. \tag{14}$$

In an example embodiment, complementarily, the resource pool split proportion for NR in the LFB for DL may be:

$$\gamma_{NR,LFB}^{DL} = 1 - \gamma_{LTE,LFB}^{DL}. \tag{15}$$

The equations for UL and for the HFB may be similarly derived.

In an example embodiment, in primary carrier assignment (PCA), the LB may update the RSS or PHR thresholds with an adjustment step ($S_{r,m}^{DL,delta}$) that is proportional to the difference in load metrics or proportional to the ratio of load metrics.

As to band assignment, two options may be provided. The first option relates to coverage threshold adjustment based on LM difference such as:

$$S_{LTE,HFB}^{DL,delta} = \beta(L_{LTE,HFB}^{DL} - L_{LTE,LFB}^{DL}), \tag{16}$$

where β (β>0) is a step size. The uplink threshold adjustment for the HFB ($S_{LTE,HFB}{}^{UL,delta}$) may be similarly derived. The threshold adjustment for the NR ($S_{NR,HFB}{}^{UL,delta}$ and $S_{NF,HRB}{}^{UL,delta}$) may be similarly derived.

The second option relates to threshold adjustment based on LM ratio such as:

$$S_{LTE,HFB}^{DL,delta} = \beta \log\left(\frac{L_{LTE,HFB}^{DL}}{L_{LTE,LFB}^{DL}}\right). \tag{17}$$

For the HFB, the new coverage threshold may be determined by the prior coverage threshold, the adjustment, and the minimum coverage threshold $S_{LTE,HFB}{}^{DL,min}$ which is based on the type of multi-carrier operation, as listed in Table I.

$$S_{LTE,HFB}^{DL,new} = \tag{18}$$
$$\begin{cases} S_{LTE,LFB}^{DL,min} & \text{for } LFB \\ \min(\max(S_{LTE,HFB}^{DL,old} + S_{LTE,HFB}^{DL,delta}, S_{LTE,HFB}^{DL,min}), S_{LTE,HFB}^{DL,max}), & \text{for } HFB \end{cases}$$

According to certain example embodiments, the coverage threshold for LTE uplink and for NR downlink and uplink may be similarly derived.

Further, in an example embodiment of intra-band carrier assignment, since there is only a single carrier in each band, intra-band carrier assignment may not be applicable.

Figure 6:
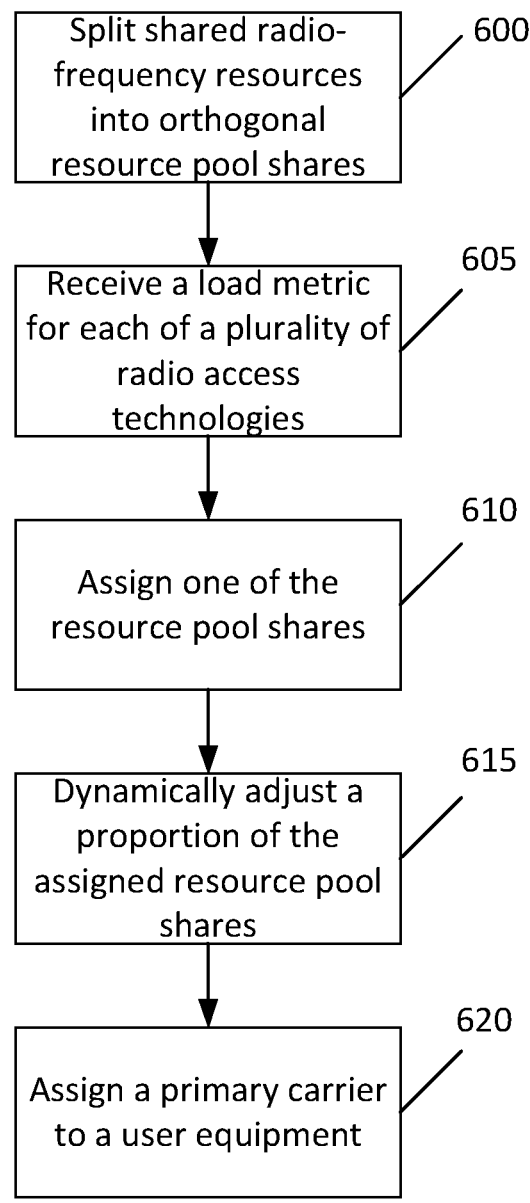
FIG. 6 illustrates a flow diagram of a method, according to an example embodiment.

FIG. 6 illustrates an exemplary flow diagram of a method according to an example embodiment. In certain example embodiments, the flow diagram of FIG. 6 may be performed by apparatus 10 illustrated in FIG. 8a. According to one example embodiment, the method of FIG. 6 may include initially, at 600, splitting shared radio-frequency resources into orthogonal resource pool shares. The method may also include, at 605, receiving a load metric for each of a plurality of radio access technologies. In addition, the method may include, at 610, assigning, based on the load metric, one of the resource pool shares to each of the plurality of radio access technologies. Further, the method may include, at 615, dynamically adjusting a proportion of the assigned resource pool shares based on the load metric of each of the plurality of radio access technologies at corresponding carriers. The method may also include, at 620, assigning a primary carrier to a user equipment based on the load metric, the resource pool share, a coverage of the carriers' physical channels, and a type of multi-carrier operation for each of the plurality of radio access technologies. According to other example embodiments, the primary carrier may be assigned to a user equipment based on one or a combination of the load metric, coverage thresholds of the carriers' physical channels, a type of multi-carrier operation on the carriers, and the resource pool share for each of the plurality of radio access technologies.

According to an example embodiment, splitting of the shared radio-frequency resources and assigning the primary carrier may be performed iteratively. In another example embodiment, assigning the user equipment to a primary carrier may take into account intra-radio access technology and inter-radio access technology loads on the primary carrier. In another example embodiment, the method may include calculating a time division duplex uplink/downlink split proportion based on a utilization of the resource pool share at the primary carrier. According to a further example embodiment, each of the resource pool shares may be an aggregation of segments of time and frequency that is for exclusive use of a specific radio access technology. In another example embodiment, the plurality of radio access technologies may have an agreement on how to partition the resource pool shares among themselves, and the plurality of radio access technologies may have an agreement on how to partition the time division duplex uplink/downlink split proportion.

In a further example embodiment, the uplink/downlink split proportion may be determined at each time division duplex carrier of each band of a network independent of other carriers. Further, according to an example embodiment, assigning the primary carrier may include a band assignment and an intra-band carrier assignment. In another example embodiment, the band assignment may be determined based on a received signal strength threshold or a power headroom threshold, and the intra-band carrier assignment may be performed when there are two or more carriers for each band.

In another example embodiment, the received signal strength threshold or power headroom threshold may be determined based on the load metric, the coverage thresholds of the carriers' physical channels, and the type of multi-carrier operation on the carriers. According to a further example embodiment, the load metric of each of the plurality of radio access technologies may include an average cell proportionally fair metric or an average resource pool share utilization metric. Further, in an example embodiment, the average cell proportionally fair metric may incorporate an achievable downlink instantaneous throughput of a user at a resource of a carrier for a link, an averaged throughput of the user through the carrier for the link, quality of service factors, and load prioritization factors. In a further example embodiment, the average resource pool share utilization metric indicates resource utilization for a plurality of radio access technologies, the carriers and the link, and incorporates load prioritization factors.

Figure 7:
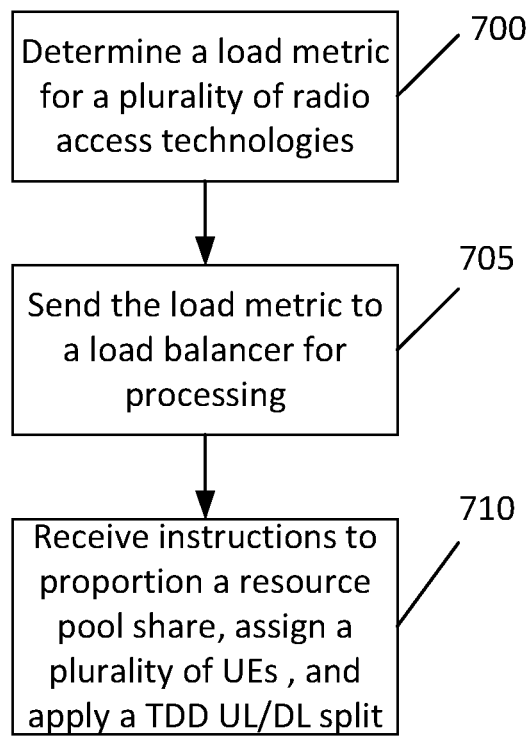
FIG. 7 illustrates a flow diagram of another method, according to an example embodiment.

FIG. 7 illustrates an exemplary flow diagram of another method according to an example embodiment. In certain example embodiments, the flow diagram of FIG. 7 may be performed by apparatus 20 illustrated in FIG. 8b.

According to one example embodiment, the method of FIG. 7 may include initially, at 700, determining a load metric for each of a plurality of radio access technologies. The method may also include, at 705, sending the load metric to a load balancer for processing. The method may further include, at 710, receiving, based on the process load metric, instructions to proportion a resource pool share for each of the plurality of radio access technologies. The instructions may also include to schedule a plurality of user terminals for each resource pool share proportioned to each of the plurality of radio access technologies at corresponding carriers. In addition, the instructions may include to apply a time division duplex uplink/downlink split proportion at a radio access technology to split portions of the proportioned resource pool share for uplink or downlink transmission.

According to an example embodiment, the time division duplex uplink/downlink split proportion may be performed iteratively. In another example embodiment, each of the resource pool shares may be an aggregation of segments of time and frequency that is for exclusive use of a specific radio access technology. In another example embodiment, the plurality of radio access technologies may have an agreement on how to partition the resource pool shares among themselves. In a further example embodiment, the plurality of radio access technologies may have an agreement on how to partition the time division duplex uplink/downlink split proportion. According to another example embodiment, the uplink/downlink split proportion may be determined at each time division duplex carrier of each band of a network independent of other carriers.

In another example embodiment, the load metric of each of the plurality of radio access technologies may include an average cell proportionally fair metric or an average resource pool share utilization metric. According to a further example embodiment, the average cell proportionally fair metric may incorporate an achievable downlink instantaneous throughput of a user at a resource of a carrier, an averaged downlink throughput of the user of the carrier, and quality of service factors. According to another example embodiment, the average resource pool share utilization metric may indicate resource utilization for a plurality of radio access technologies, the carriers and the links, and incorporates load prioritization factors.

Figure 8A:
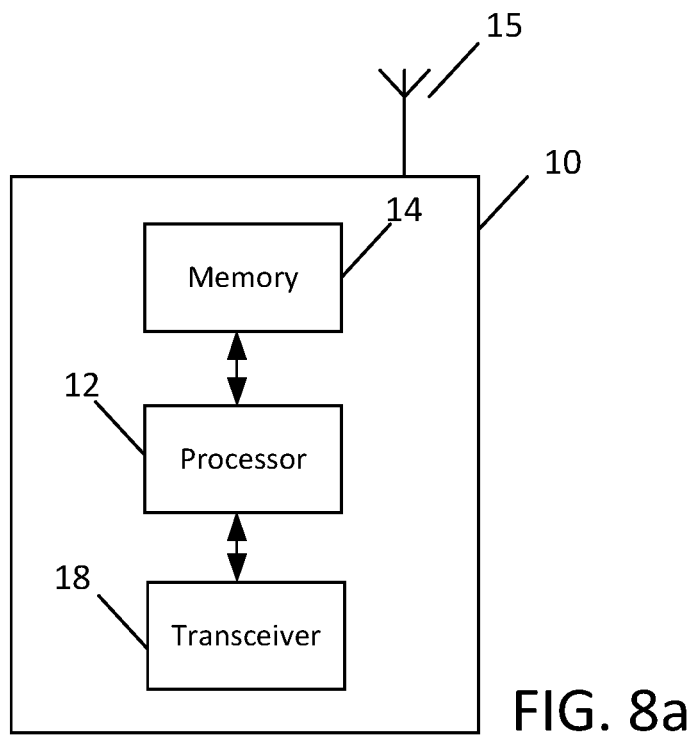
FIG. 8(a) illustrates a block diagram of an apparatus, according to an example embodiment.

FIG. 8a illustrates an example apparatus 10 according to an example embodiment. In an embodiment, the apparatus 10 may be a node or element in a communications network or associated with such a network, such as a load balancer, or other device.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 8a.

As illustrated in the example of FIG. 8a, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8a, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 4-6.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 4-6.

In some embodiments, apparatus 10 may also include or be coupled to one or more antennas 18 for receiving a downlink signal and for transmitting via an uplink from apparatus 10. Apparatus 10 may further include a transceiver 18 configured to transmit and receive information. The transceiver 28 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 10 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 28 may be included in or may form a part of transceiving circuitry.

As discussed above, according to certain example embodiments, apparatus 10 may be a UE, mobile device, mobile station, ME, IoT device, NB-IoT device, and/or a drone for example. According to certain embodiments, apparatus 10 may be controlled by memory 14 and processor 12 to perform the functions associated with example embodiments described herein. For example, in some embodiments, apparatus 10 may be configured to perform one or more of the processes depicted in any of the flow charts or signaling diagrams described herein, such as the flow diagram illustrated in FIGS. 4-6.

For instance, in one embodiment, apparatus 10 may be controlled by memory 14 and processor 12 to split shared radio-frequency resources into orthogonal resource pool shares. The apparatus 10 may also be controlled by memory 14 and processor 12 to receive a load metric for each of a plurality of radio access technologies. In addition, the apparatus 10 may be controlled by memory and processor 12 to assign, based on the load metric, one of the resource pool shares to each of the plurality of radio access technologies. Further, the apparatus 10 may be controlled by memory 14 and processor 12 to dynamically adjust a proportion of the assigned resource pool shares based on the load metric of each of the plurality of radio access technologies at corresponding carriers. In addition, the apparatus 10 may be controlled by memory 14 and processor 12 to assign a primary carrier to a user equipment based on the load metric, the resource pool share, a coverage of the carriers' physical channels, and a type of multi-carrier operation for each of the plurality of radio access technologies.

Figure 8B:
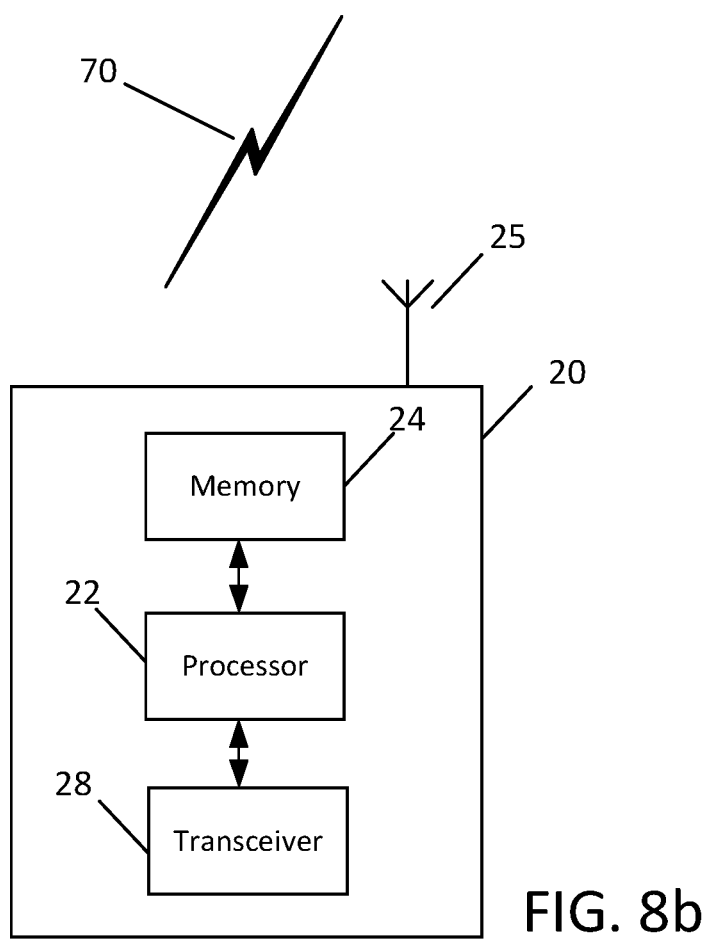
FIG. 8(b) illustrates a block diagram of another apparatus, according to an example embodiment.

FIG. 8b illustrates an example of an apparatus 20 according to an example embodiment. In an example embodiment, the apparatus 20 may be a RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 8b.

As illustrated in the example of FIG. 8b, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 4, 5, and 7.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 4, 5, and 7.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein, such as the flow or signaling diagrams illustrated in FIGS. 4, 5, and 7.

For instance, in one embodiment, apparatus 20 may be controlled by memory 24 and processor 22 to determine a load metric for each of a plurality radio access technologies. Apparatus 20 may also be controlled by memory 24 and processor 22 to send the load metric to a load balancer for processing. In addition, apparatus 20 may be controlled by memory 24 and processor 22 to receive, based on the processed load metric, instructions to proportion a resource pool share for each of the plurality of radio access technologies. The instructions may also include to assign a plurality of user terminals for each resource pool share proportioned to each of the plurality of radio access technologies at corresponding carriers. The instructions may further include to apply a time division duplex uplink/downlink split proportion at a radio access technology to split portions of the proportioned resource pool share for uplink or downlink transmission.

Certain example embodiments described herein provide several technical improvements, enhancements, and/or advantages. In some example embodiments, it is possible to define a unified LB algorithm that handles both spectrum sharing (between LTE and NR) and LFB HFB coupling (within NR), in addition to the existing LB among carriers within LTE and within NR, and UL/DL split for TDD systems. Certain example embodiments may also provide feasible solutions for DSS at the onset of coexistent NR-LTE deployments. In addition, certain embodiments may provide, through multi-carrier spectrum sharing, LFB resources that can be utilized together with the HFB carrier for new 5G users while maintaining the same LFB resources to support pre-existing LTE users. Other example embodiments may provide means of equitably sharing both the spectrum and time resources to UEs of both RATs (e.g., LTE and 5G-NR) and over multiple carriers.

According to certain example embodiments, it may also be possible to provide a method and apparatus for inter-RAT load balancing of MC-DSS (MC-DSS LB) that maximizes user throughputs and improves reliability by iteratively and equitably adjusting certain elements. For example, the adjustments may include 1) the RSS or power headroom thresholds and target assignment proportions for primary carrier assignment. The adjustments may also include, 2) the partitioning of shared resource pools, and 3) the TDD frame configuration. With certain example embodiments, it may be possible to take into consideration the load of other RATs when assigning users to the primary carriers in order to allow enough resources for the other RAT. It may also be possible to consider the load of the other RATs when calculating TDD UL/DL split and shared resource pool split. The result may be a throughput-optimized allocation of common resources for both RATs used by an operator.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 5G NR and LTE technology, the above embodiments may also apply to any other present or future 3GPP technology, such as LTE-advanced, and/or fourth generation (4G) technology.

Partial Glossary

ACPF Average Cell Proportionally Fair Metric
eNB Enhanced Node B
DL Downlink
DSS Dynamic Spectrum Sharing
gNB 5G or NR Base Station
HFB High Frequency Band
LB Load Balancing
LFB Low Frequency Band
LM Load Metric
LTE Long Term Evolution
NR New Radio
PCA Primary Carrier Assignment
PHR Power Head Room
PM Performance Management
QoS Quality-of-Service
RAT Radio Access Technology
RRM Radio Resource Manager
RSS Received Signal Strength
SS Spectrum Sharing
TC Tight Coupling
TDD Time Division Duplex
UE User Equipment
UL Uplink

We claim:

1. An apparatus, comprising:
at least one processor; and
at least one non-transitory memory comprising computer program code,
the at least one non-transitory memory and the computer program code are configured, with the at least one processor, to cause the apparatus at least to:
split shared radio-frequency resources into orthogonal resource pool shares;
receive a load metric for respective ones of a plurality of radio access technologies;
assign, based on the load metric, respective ones of the orthogonal resource pool shares to the respective ones of the plurality of radio access technologies;
dynamically adjust a proportion of the assigned orthogonal resource pool shares based on a corresponding load metric of the respective ones of the plurality of radio access technologies at corresponding carriers; and
assign a primary carrier to a user equipment based on the load metric, the orthogonal resource pool share, a coverage of physical channels of the corresponding carriers, and a type of multi-carrier operation for the respective ones of the plurality of radio access technologies.

2. The apparatus according to claim 1, wherein splitting of the shared radio-frequency resources and assigning the primary carrier are performed iteratively.

3. The apparatus according to claim 1, wherein assigning the primary carrier to the user equipment takes into account intra-radio access technology and inter-radio access technology loads on the primary carrier, the coverage of the primary carrier, and the type of multi-carrier operation.

4. The apparatus according to claim 1, wherein the at least one non-transitory memory and the computer program code are configured, with the at least one processor, to cause the apparatus at least to:
calculate a time division duplex uplink/downlink split proportion based on a utilization of the orthogonal resource pool share at the primary carrier.

5. The apparatus according to claim 1, wherein the respective ones of the orthogonal resource pool shares is an aggregation of segments of time and frequency that is for exclusive use of a specific radio access technology.

6. The apparatus according to claim 4,
wherein the plurality of radio access technologies have an agreement on how to partition the orthogonal resource pool shares among themselves, and
wherein the plurality of radio access technologies have an agreement on how to partition the time division duplex uplink/downlink split proportion.

7. The apparatus according to claim 4, wherein the uplink/downlink split proportion is determined at respective time division duplex carriers of respective bands of a network independent of other carriers.

8. The apparatus according to claim 1, wherein assigning the primary carrier comprises a band assignment and an intra-band carrier assignment.

9. The apparatus according to claim 8,
wherein the band assignment is determined based on a received signal strength threshold or a power headroom threshold, and
wherein the intra-band carrier assignment is performed when there are two or more carriers for respective bands.

10. The apparatus according to claim 9,
wherein the received signal strength threshold or power headroom threshold is determined based on the load metric, and coverage thresholds of the physical channels of the corresponding carriers, and a type of multi-carrier operation on the carriers.

11. The apparatus according to claim 1, wherein the load metric of the respective ones of the plurality of radio access technologies comprises an average cell proportionally fair metric or an average resource pool share utilization metric.

12. The apparatus according to claim 11,
wherein the average cell proportionally fair metric incorporates an achievable instantaneous throughput of a user at a resource of a carrier for a link, an averaged downlink throughput of the user of the carrier, and quality of service factors, and
wherein the average resource pool share utilization metric indicates resource utilization for the plurality of radio access technologies, the carrier and the link, and incorporates load prioritization factors.

13. An apparatus, comprising:
at least one processor; and
at least one non-transitory memory comprising computer program code,
the at least one non-transitory memory and the computer program code are configured, with the at least one processor to cause the apparatus at least to:
determine a load metric for respective ones of a plurality radio access technologies;
send the load metric to a load balancer for processing; and
receive, based on the processed load metric, instructions to:
proportion a resource pool share for the respective ones of the plurality of radio access technologies,
assign a plurality of user terminals for respective resource pool shares proportioned to the respective ones of the plurality of radio access technologies at corresponding carriers, and
for a carrier with a time-division duplex frame configuration, apply a time division duplex uplink/downlink split proportion at a radio access technology to split portions of the proportioned resource pool share for uplink or downlink transmission.

14. The apparatus according to claim 13, wherein the instructions to perform time division duplex uplink/downlink split proportion are configured to be performed iteratively.

15. The apparatus according to claim 13, wherein respective ones of the resource pool shares are an aggregation of segments of time and frequency that is for exclusive use of a specific radio access technology.

16. The apparatus according to claim 13,
wherein the plurality of radio access technologies have an agreement on how to partition the resource pool shares among themselves, and
wherein the plurality of radio access technologies have an agreement on how to partition the time division duplex uplink/downlink split proportion.

17. The apparatus according to claim 13, wherein the uplink/downlink split proportion is determined at respective time division duplex carriers of respective bands of a network independent of other carriers.

18. The apparatus according to claim 13, wherein the load metric of the respective ones of the plurality of radio access technologies comprises an average cell proportionally fair metric or an average resource pool share utilization metric.

19. The apparatus according to claim 18,
wherein the average cell proportionally fair metric incorporates an achievable instantaneous throughput of a user at a resource of a carrier for a link, an averaged throughput of the user of the carrier, and quality of service factors, and load prioritization factors, and
wherein the average resource pool share utilization metric indicates the resource utilization for the plurality of radio access technologies, the carrier and the link, and incorporates load prioritization factors.

20. A method, comprising:
splitting shared radio-frequency resources into orthogonal resource pool shares;
receiving a load metric for respective ones of a plurality of radio access technologies;
assigning, based on the load metric, respective ones of the orthogonal resource pool shares to the respective ones of the plurality of radio access technologies;
dynamically adjusting a proportion of the assigned orthogonal resource pool shares based on a corresponding load metric of the respective ones of the plurality of radio access technologies at corresponding carriers; and
assigning a primary carrier to a user equipment based on the load metric, the orthogonal resource pool share, a coverage of physical channels of the corresponding carriers, and a type of multi-carrier operation for the respective ones of the plurality of radio access technologies.

* * * * *